United States Patent [19]

Starta et al.

[11] Patent Number: 4,495,842
[45] Date of Patent: Jan. 29, 1985

[54] THRUST BEARING SCRAPING TOOL

[75] Inventors: Daniel G. Starta, Trafford; Richard W. Hood, Greensburg, both of Pa.

[73] Assignee: Elliott Turbomachinery Co., Inc., Jeannette, Pa.

[21] Appl. No.: 486,135

[22] Filed: Apr. 18, 1983

[51] Int. Cl.³ .............................................. B23B 5/00
[52] U.S. Cl. ...................................... 82/4 R; 82/1 R; 82/12; 15/256.5; 409/308
[58] Field of Search ............... 82/4 R, 4 C, 1 R, 1 A, 82/12; 30/169, 272 R, 273; 29/148.4 R, 724; 409/292, 308, 310, 337, 903; 15/256.5

[56] References Cited

U.S. PATENT DOCUMENTS

| | | | |
|---|---|---|---|
| 396,652 | 1/1889 | Getman | 409/308 |
| 836,715 | 11/1906 | Smith | 82/1 R |
| 1,536,938 | 5/1925 | Schifl | 82/1.1 |
| 1,823,461 | 9/1931 | Monckmeier | 82/1 R |
| 1,934,950 | 11/1933 | Robison | 82/1 R |
| 4,033,231 | 7/1977 | Goloff et al. | 409/291 |

Primary Examiner—Leonidas Vlachos
Attorney, Agent, or Firm—Robert P. Hayter

[57] ABSTRACT

A thrust bearing has a curved surface machined therein by a cutter which is positioned by a cam as the bearing is rotated. The cam causes the cutter to pivot so that a sloped cut is made rather than a conventional planar cut.

3 Claims, 5 Drawing Figures

THRUST BEARING SCRAPING TOOL

BACKGROUND OF THE INVENTION

Thrust bearings are made of relatively soft metals such as babbit or lead. Because the materials are soft, it is standard practice to do the final machining step by manual means. The scraping is done by using a fixed cutting tool and rotating the bearing under it. This produces a single plane or a dual plane cut whereas the desired surface is curved and not in a single plane. The amount of material removed is on the order of 0.002 inches.

SUMMARY OF THE INVENTION

The present invention is directed to a thrust bearing scraping tool for providing an improved thrust face contour for increased thrust load carrying capabilities. More specifically, the present invention utilizes a cam to position the cutting tool. The cam is driven through a manually actuated worm gear arrangement whereby the cam and bearing are rotated as a unit while the cam positions the cutting tool with respect to the surface of the bearing.

It is an object of this invention to provide an improved thrust face contour on a thrust bearing.

It is another object of this invention to provide a thrust bearing having increased load carrying capabilities.

It is a further object of this invention to provide apparatus for machining a thrust bearing surface to design requirements.

It is a still further object of this invention to provide apparatus for machining a curved surface on the face of a thrust bearing. These objects, and others as will become apparent hereinafter, are accomplished by the present invention.

Basically a thrust bearing and cam rotate as a unit while the cam follower and cutting tool move up and down as a unit according to the cam profile. Rotation of the thrust bearing and cam is achieved through a manually driven worm gear arrangement.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
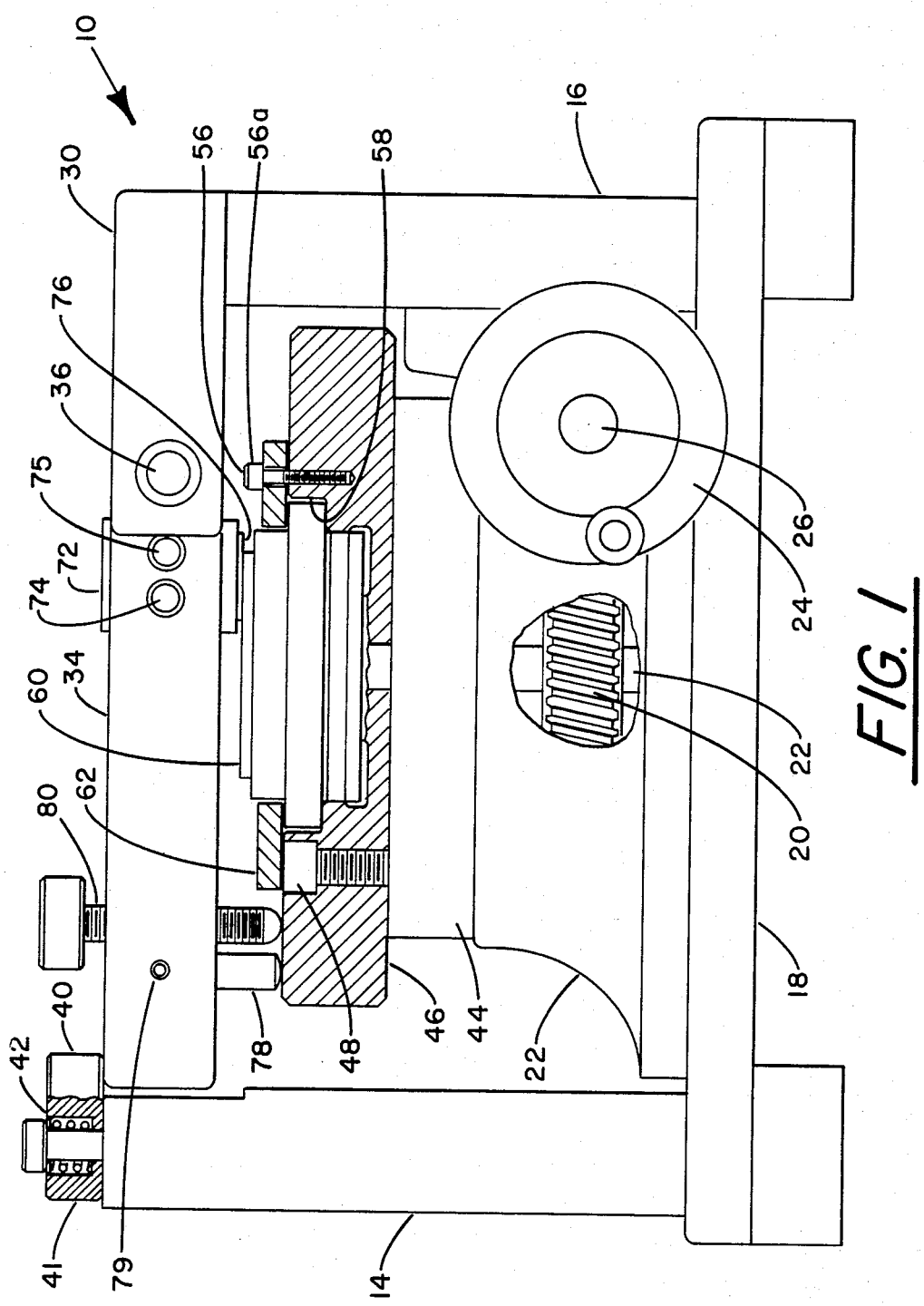
FIG. 1 is a side, partially cutaway and sectional view of the tool of the present invention.
Figure 2:
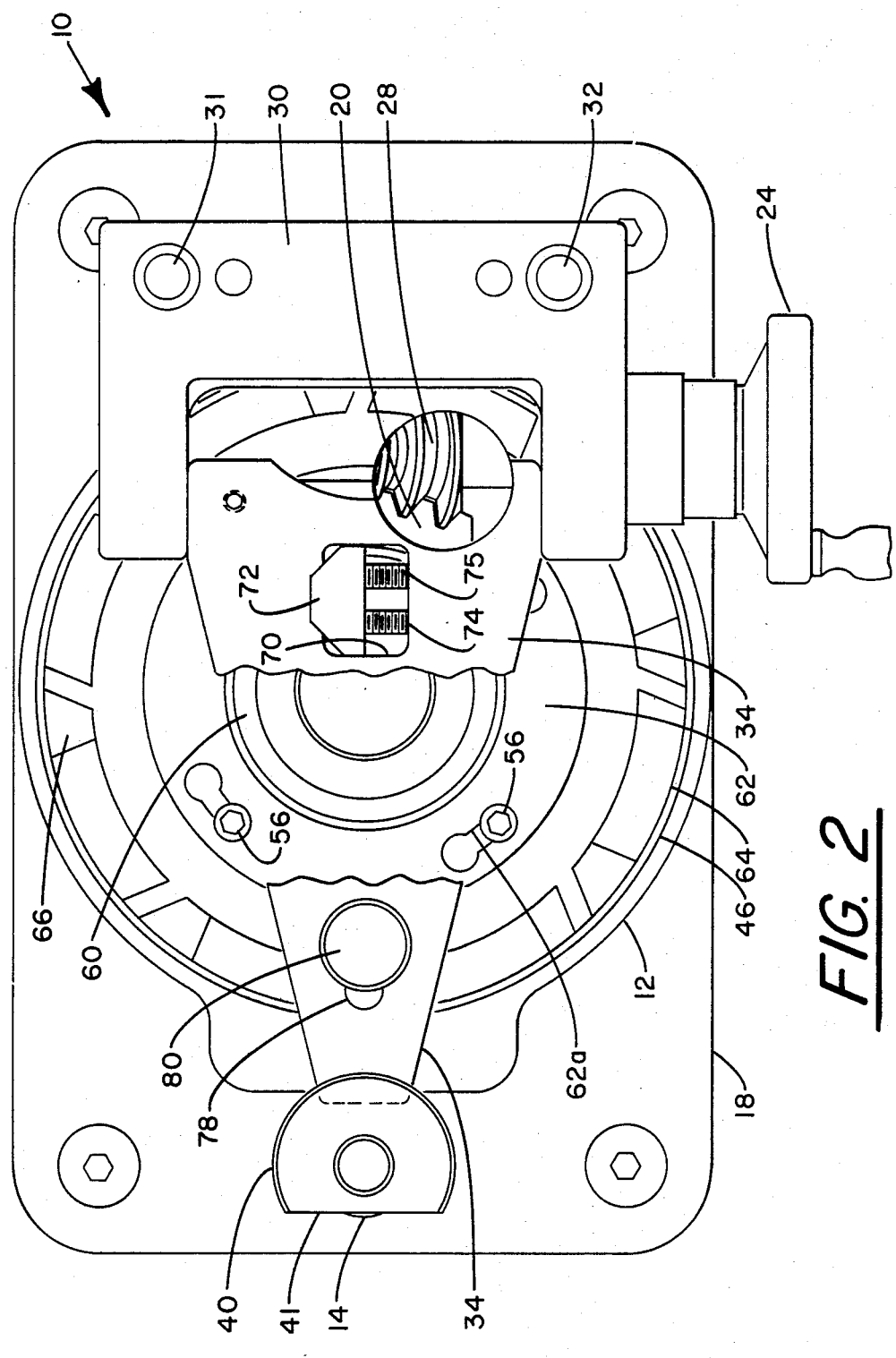
FIG. 2 is a top, partially cutaway view of the tool of the present invention.
Figure 3:
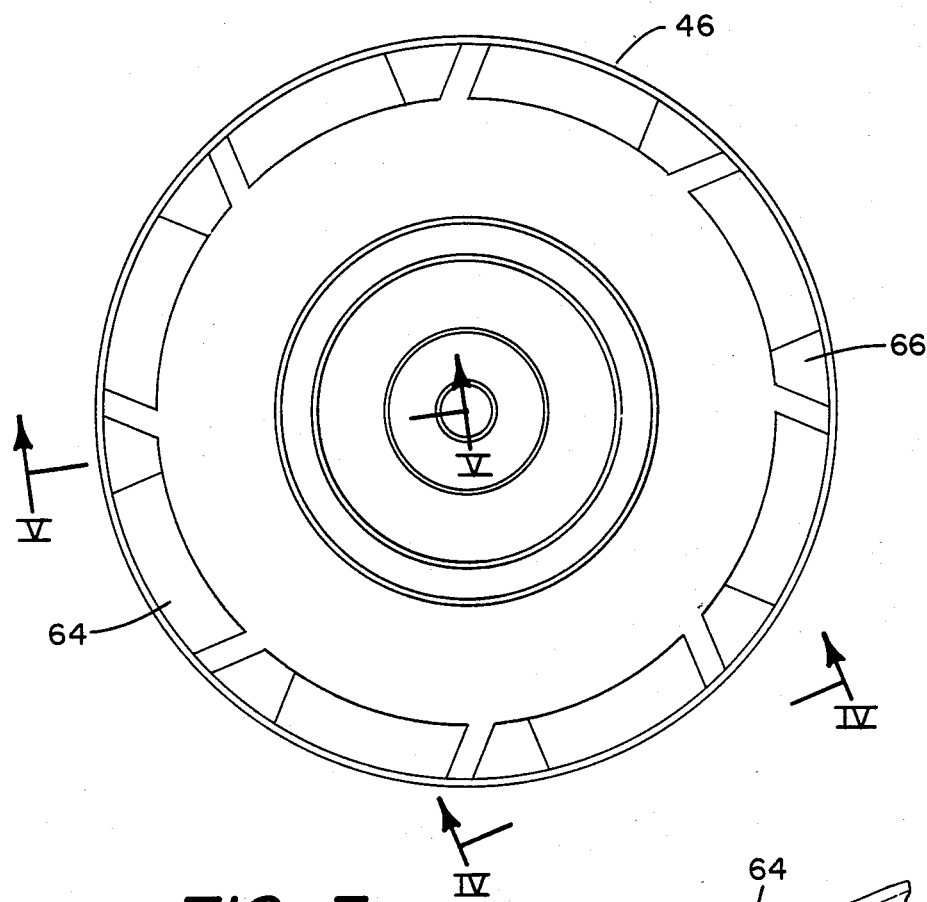
FIG. 3 is a top view of the cam.
Figure 4:
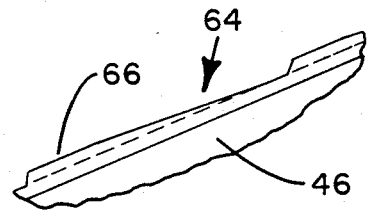
FIG. 4 is a side view of the cam taken along line IV—IV of FIG. 3.

In FIGS. 1 and 2 the numeral 10 generally designates a thrust bearing scraping tool or fixture. Tool 10 includes a body 12 and vertical members 14 and 16 mounted on a base 18. Body 12 contains a worm wheel 20 mounted on shaft 22 for rotation therewith. Hand wheel 24 is mounted on shaft 26 which has a worm 28 thereon in operative engagement with worm wheel 20. Vertical member 16 has a yoke member 30 secured thereto by machine screws 31 and 32. Cover member 34 is pivotally connected to yoke 30 by shaft 36. Cover member 34 is locked in place by spring loaded washer 40 which has a segment removed to form a flat face 41 and a spring 42. Plate member 44 is integral with shaft 22 and is rotated therewith. Bearing support fixture 46 is secured to plate 44 by machine screw 48. A plurality of machine screws 56 are threaded into fixture 46 with their heads 56a spaced therefrom. Bearing 60 is received in recess 58 formed in fixture 46 and is locked in place by locking ring 62 which has slots 62a which coact with machine screws 56. As best shown in FIGS. 2, 3 and 4, an annular cam 64 is formed on fixture 46 and includes a plurality of lands 66.

Figure 5:
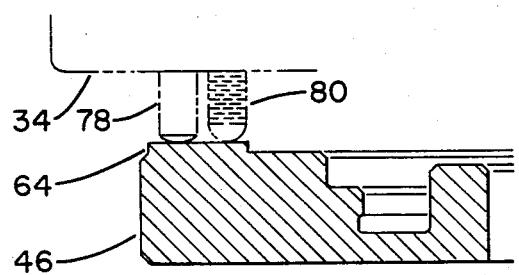
FIG. 5 is a sectional view taken along line V—V of FIG. 3.

Cover member 34 has an opening 70 for receiving cutting tool holder 72. Cutting tool holder 72 is held in place by screws 74 and 75 and carries cutter 76. Pin 78 is fixed in cover member 34 by set screw 79 and, as best shown in FIG. 5, acts as a cam follower with respect to cam 64. Threaded member 80 is threadably received in cover member 34 and engages cam 64 as an adjustable cam follower to limit the amount of material removed from bearing 60 by cutter 76 on the cut, but pin 78 determines the finished height of the bearing surface.

In operation, spring loaded washer 40 is positioned with flat face 41 facing cover member 34 which is rotated clockwise as shown in FIG. 1. Locking ring 62 is rotated counterclockwise, as shown in FIG. 2, and lifted off of bearing support fixture 46. The bearing 60 which is to be scraped/machined is placed in recess 58, locking ring 62 is placed over screws 56 and rotated clockwise. Screws 56 are then tightened to cause heads 56a to hold locking ring 62 in place. Cover member 34 is rotated to a horizontal position and the spring loaded washer 40 is pulled upward and rotated 180° to the position illustrated thereby overlying and spring biasing the cover member 34. The threaded member 80 is adjusted to extend past pin 78 to allow 1 to 2 mils of metal to be removed from the bearing 60, per revolution, as threaded member 80 rides along cam 64 as an adjustable cam follower.

As noted, the spring 42 biases cover 34 and thereby cutter 76 into engagement with the bearing 60. Turning hand wheel 24 and thereby worm 28 causes worm wheel 20 and thereby fixture 46 and bearing 60 to rotate. This would produce the conventional scraping action of the cutter 76 on bearing 60 absent the features of the present invention. As cutter 76 scrapes the surface of bearing 60, the nature of the cutting action is dictated by the cam 64 as the cutting action can only take place where cam follower 78 and/or threaded member 80 permit it. As cam follower 78 and/or threaded member 80 move up and down as they trace cam 64; the cover 34 and cutter 76 pivot about shaft 36 to change the slope as well as the depth of the cut. Therefore, as the cutting action takes place as dictated by the shape of the cam 64, a curved surface is machined on the bearing 60. After each revolution, the threaded member 80 is retracted to permit additional engagement of bearing 60 by cutter 76 to permit the removal of more material since more material must be removed from the resultant tapered surface than the 1 or 2 mils removed per revolution. The machining action takes place until the end of pin 78 engages cam 64 to prevent further cutting action. Ordinary, it will take about three revolutions of bearing 60/adjustments of threaded member 80 for the transition from only member 80 being the cam follower to only member 78 being the cam follower. It should be noted that the cam profile is 0.011 inches in a typical device, and the engagement of the cam 64 and cam follower 78 is at a considerably greater distance from the shaft 36 than the cutter 76 so that the vertical component of the movement of the cutter 76 is much less than the vertical displacement of the cam follower 78.

Although a preferred embodiment of the present invention has been illustrated and described, other changes will occur to those skilled in the art. It is therefore intended that the scope of the present invention is to be limited only by the scope of the appended claims.

What is claimed is:

1. A bearing scraping tool comprising:
    means mounting a bearing;
    means rotating said means mounting a bearing;
    cutting means;
    means pivotally mounting said cutting means with respect to said means mounting a bearing whereby said cutting means moves vertically and angularly with respect to said means mounting a bearing when pivoted;
    means resiliently biasing said means pivotally mounting towards said means mounting a bearing;
    means pivotally moving said cutting means when said means mounting a bearing is being rotated.

2. The tool of claim 1 wherein said means pivotally moving said cutting means includes a cam and cam follower.

3. The tool of claim 2 further including an adjustable cam follower.

* * * * *